United States Patent
Hashimura et al.

(10) Patent No.: US 11,072,373 B2
(45) Date of Patent: Jul. 27, 2021

(54) VEHICLE STRUCTURAL MEMBER AND METHOD FOR PRODUCING SAME

(71) Applicant: KABUSHIKI KAISHA KOBE SEIKO SHO (KOBE STEEL, LTD.), Hyogo (JP)

(72) Inventors: Toru Hashimura, Kobe (JP); Taiki Yamakawa, Kobe (JP); Yasuhiro Maeda, Kobe (JP)

(73) Assignee: Kobe Steel, Ltd., Hyogo (JP)

( * ) Notice: Subject to any disclaimer, the term of this patent is extended or adjusted under 35 U.S.C. 154(b) by 97 days.

(21) Appl. No.: 16/491,894

(22) PCT Filed: Mar. 15, 2018

(86) PCT No.: PCT/JP2018/010291
§ 371 (c)(1),
(2) Date: Sep. 6, 2019

(87) PCT Pub. No.: WO2018/180556
PCT Pub. Date: Oct. 4, 2018

(65) Prior Publication Data
US 2020/0010122 A1  Jan. 9, 2020

(30) Foreign Application Priority Data

Mar. 28, 2017 (JP) .............................. JP2017-063460
Sep. 21, 2017 (JP) .............................. JP2017-181612

(51) Int. Cl.
*B60J 9/00* (2006.01)
*B62D 25/14* (2006.01)
(Continued)

(52) U.S. Cl.
CPC .............. *B62D 25/145* (2013.01); *B21J 5/06* (2013.01); *B62D 1/02* (2013.01); *B62D 65/02* (2013.01)

(58) Field of Classification Search
CPC . B29C 66/71; C10J 2200/09; C10J 2200/158; C10J 2300/0916;
(Continued)

(56) References Cited

U.S. PATENT DOCUMENTS 5,398,989 A     3/1995  Winter et al.
5,868,426 A *   2/1999  Edwards .............. B62D 25/147
                                                        280/779
(Continued)

FOREIGN PATENT DOCUMENTS

DE        101 30 794 A1      1/2003
DE   10 2005 031 728 A1      7/2006
(Continued)

OTHER PUBLICATIONS

The extended European search report issued by the European Patent Office dated Nov. 12, 2020, which corresponds to European Patent Application No. 18774666.4-1009 and is related to U.S. Appl. No. 16/491,894.
(Continued)

*Primary Examiner* — Kiran B Patel
(74) *Attorney, Agent, or Firm* — Studebaker & Brackett PC

(57) ABSTRACT

A vehicle structural member includes an elongate hollow member having an integrated structure, and supporting members joined to the elongate hollow member. The elongate hollow member includes: a first portion that includes a first pipe, a second pipe disposed outside the first pipe and extending along the first pipe, and a connection portion extending along the first pipe and the second pipe, formed integrally with the first pipe and the second pipe, and connecting the first pipe and the second pipe; and a second portion that includes the first pipe continuing from the first portion, and does not include the second pipe.

10 Claims, 5 Drawing Sheets

(51) Int. Cl.
*B21J 5/06* (2006.01)
*B62D 1/02* (2006.01)
*B62D 65/02* (2006.01)

(58) Field of Classification Search
CPC ............ C10J 2300/092; G01M 5/0025; B29K 2023/06; B29K 2075/00; F28D 15/0275
See application file for complete search history.

(56) References Cited

U.S. PATENT DOCUMENTS

| | | | | |
|---|---|---|---|---|
| 6,110,037 A * | 8/2000 | Yoshinaka | ............ | B60H 1/0055 454/143 |
| 6,155,631 A * | 12/2000 | Yoshinaka | ............ | B62D 25/142 296/1.03 |
| 6,203,092 B1 * | 3/2001 | Yoshinaka | ............ | B62D 25/142 296/70 |
| 6,250,678 B1 * | 6/2001 | Yoshinaka | ............ | B60H 1/0055 280/752 |
| 6,447,041 B1 * | 9/2002 | Vandersluis | ......... | B60H 1/0055 296/203.02 |
| 7,571,950 B2 * | 8/2009 | Baudart | ............ | B62D 25/147 180/90 |
| 7,607,691 B2 * | 10/2009 | Arnold | .................... | B29C 33/52 280/751 |
| 8,622,464 B2 * | 1/2014 | Atsumi | ............... | B62D 25/145 296/193.02 |
| 8,714,614 B2 * | 5/2014 | Ishikawa | .................... | B60R 7/06 296/37.12 |
| 9,580,107 B1 * | 2/2017 | Ranga | .................. | B62D 29/004 |
| 10,494,032 B2 * | 12/2019 | Mullen | .................. | B62D 29/04 |
| 2002/0084667 A1 * | 7/2002 | Sutou | .................. | B62D 25/145 296/70 |
| 2005/0134090 A1 * | 6/2005 | Kring | .................. | B62D 25/145 296/193.02 |
| 2007/0210616 A1 * | 9/2007 | Wenzel | .................. | B29C 45/006 296/187.03 |
| 2007/0295453 A1 * | 12/2007 | Koelman | ............. | B62D 25/145 156/331.8 |
| 2008/0054682 A1 * | 3/2008 | Ellison | .................. | B62D 25/145 296/193.02 |
| 2008/0238128 A1 * | 10/2008 | Baudart | .................. | B62D 65/14 296/70 |
| 2010/0327627 A1 * | 12/2010 | Leanza | ................. | B62D 25/145 296/190.01 |
| 2011/0095570 A1 * | 4/2011 | Durocher | ............. | B62D 25/145 296/193.02 |
| 2012/0032044 A1 * | 2/2012 | Ruiz Rincon | ........ | B62D 29/001 248/205.3 |
| 2012/0273539 A1 * | 11/2012 | Carter | .................. | B62D 25/145 224/545 |
| 2015/0183469 A1 * | 7/2015 | Kong | .................... | B62D 25/145 296/193.02 |
| 2015/0298720 A1 * | 10/2015 | Nakane | .................... | B62D 1/16 280/779 |
| 2019/0016395 A1 * | 1/2019 | Kajikawa | ............ | B62D 25/145 |
| 2019/0031247 A1 * | 1/2019 | Baudart | ............ | B62D 25/142 |
| 2020/0122778 A1 * | 4/2020 | Werneke | ............ | B62D 25/145 |

FOREIGN PATENT DOCUMENTS

| | | |
|---|---|---|
| EP | 1655209 A1 | 5/2006 |
| EP | 2 322 387 A1 | 5/2011 |
| JP | 2006-264469 A | 10/2006 |
| JP | 4821329 B2 | 11/2011 |

OTHER PUBLICATIONS

Notification of Transmittal of Translation of the International Preliminary Report on Patentability and Translation of Written Opinion of the International Searching Authority; PCT/JP2018/010291; dated Oct. 10, 2019.

* cited by examiner

VEHICLE STRUCTURAL MEMBER AND METHOD FOR PRODUCING SAME

CROSS-REFERENCE TO RELATED APPLICATIONS

This is a national phase application in the U.S. of International Patent Application No. PCT/JP2018/010291 with an international filing date of Mar. 15, 2018, which claims priorities of Japanese Patent Applications No. 2017-063460 filed on Mar. 28, 2017 and No. 2017-181612 filed on Sep. 21, 2017 the contents of which are incorporated herein by reference.

TECHNICAL FIELD

The present invention relates to a vehicle structural member and method for producing the same.

BACKGROUND ART

An instrument panel reinforcement structure of JP 4821329 B1 includes a large-diameter cylinder and a small-diameter cylinder as cylindrical members coupled to each other in a longitudinal direction. The large-diameter cylinder has a diameter larger than a diameter of the small-diameter cylinder, and includes a small-diameter portion which is diameter-reduced and disposed at an end of the large-diameter cylinder. The small-diameter portion of the large-diameter cylinder is joined to the small-diameter cylinder by welding.

PRIOR ART DOCUMENT

Patent Document

Patent Document 1: JP 4821329 B1

SUMMARY OT THE INVENTION

Problems to be Solved by the Invention

According to the instrument panel reinforcement structure of JP 4821329 B1, the two cylindrical members having different diameters are joined to each other. This structure therefore requires both processes for reduction of the diameter of the large-diameter cylinder, and welding between the large-diameter cylinder and the small-diameter cylinder, and raises processing cost.

An object of the present invention is to provide a vehicle structural member capable of reducing processing cost.

Means for Solving the Problems

One aspect of the present invention provides a vehicle structural member comprising: an elongate hollow member having an integrated structure; and a supporting member joined to the elongate hollow member. The elongate hollow member includes: a first portion that includes a first pipe, a second pipe disposed outside the first pipe and extending along the first pipe, and a connection portion extending along the first pipe and the second pipe, formed integrally with the first pipe and the second pipe, and connecting the first pipe and the second pipe; and a second portion that includes the first pipe continuing from the first portion, and does not include the second pipe.

The first portion which includes the first pipe and the second pipe has higher strength and rigidity than strength and rigidity of the second portion which includes the first pipe but does not include the second pipe. In addition, the first portion having an integrated structure requires neither welding nor diameter reduction for welding. Accordingly, reduction of processing cost is achievable while partially improving strength and rigidity of the vehicle structural member. Moreover, the elongate hollow member having an integrated structure without any joint parts has higher strength and rigidity in comparison with strength and rigidity of a similar member produced by joining a plurality of members. Furthermore, the elongate hollow member not diameter-reduced easily achieves pipe expansion when joined to a supporting member such as a bracket.

The first pipe and the second pipe may be spaced apart from each other in a direction crossing longitudinal directions of the first pipe and the second pipe. The connection portion may be a plate-shaped portion.

The connection portion constituted by a plate-shaped portion and formed between the first pipe and the second pipe is cut at the time of cutting of the first pipe and the second pipe. Accordingly, an open cross-section is not produced between the first pipe and the second pipe.

Positions of one end of the first pipe and one end of the second pipe may be aligned with each other in the longitudinal directions of the first pipe and the second pipe.

Each of the first pipe and the second pipe may have a substantially constant cross-sectional shape in the corresponding longitudinal direction.

The vehicle structural member may be a steering support.

Another aspect of the present invention provides a method for producing a vehicle structural member, the method comprising: a molding step of molding an element pipe including two pipes connected by a connection portion and disposed in parallel to each other; a cutting step of cutting the element pipe to separate the element pipe into two elongate hollow members each of which includes the two pipes having different lengths; and a joining step of disposing a supporting member for each of the elongate hollow members in such a position as to surround a part of the corresponding elongate hollow member, and expanding the part of the corresponding elongate hollow member to swage and join the corresponding elongate hollow member to the supporting member.

According to this producing method, the elongate hollow member is produced by cutting the element pipe. In this case, other processing such as welding and diameter reduction is not required. Accordingly, reduction of processing cost of the vehicle structural member is achievable.

The cutting step may include: forming a first cut in one of the two pipes, the first cut extending in a direction crossing a longitudinal direction of the element pipe and reaching the connection portion; forming a second cut in the other of the two pipes, the second cut being located at a position different from the position of the first cut in the longitudinal direction of the element pipe, extending in a direction crossing the longitudinal direction of the element pipe, and reaching the connection portion; and forming a third cut in the connection portion, the third cut extending in the longitudinal direction of the element pipe and connecting an end of the first cut and an end of the second cut, to cause the element pipe to be separated into the two elongate hollow members by the first to third cuts.

The joining step may include; preparing an elastic body for each of the elongate hollow members, the elastic body being insertable into the corresponding elongate hollow member; inserting the elastic body into one of the pipes of the corresponding elongate hollow member; and compressing the elastic body in the longitudinal direction of the corresponding elongate hollow member and expanding the elastic body in a direction crossing the longitudinal direction of the corresponding elongate hollow member at right angles, to expand the corresponding elongate hollow member.

According to this producing method, isotropic deformability of the elastic body achieves uniform expansion of the pipes of the elongate hollow member. This method therefore reduces a local load, thereby preventing local deformation. Accordingly, the elongate hollow member can be joined to the supporting member with higher accuracy in comparison with other joining methods.

The two pipes may have a substantially identical cross-sectional shape. The two elongate hollow members separated from the element pipe may have a substantially identical dimension.

According to this producing method, the two elongate hollow members of the same size can be produced from one element pipe by the one cutting step. Accordingly, yield can improve.

A vehicle structural member according to the present invention is capable of reducing processing cost.

BRIEF DESCRIPTION OF THE DRAWINGS

FIG. 2 is a cross-sectional view taken along a line II-II in. FIG. 1;

DESCRIPTION OF EMBODIMENTS

A vehicle structure according to an embodiment of the present invention will be hereinafter described with reference to the accompanying drawings. In some parts of following description, a width direction of a vehicle is referred to as an X direction, a front-rear direction of the vehicle is referred to as a Y direction, and an up-down direction of the vehicle is referred to as a Z direction.

Figure 1:
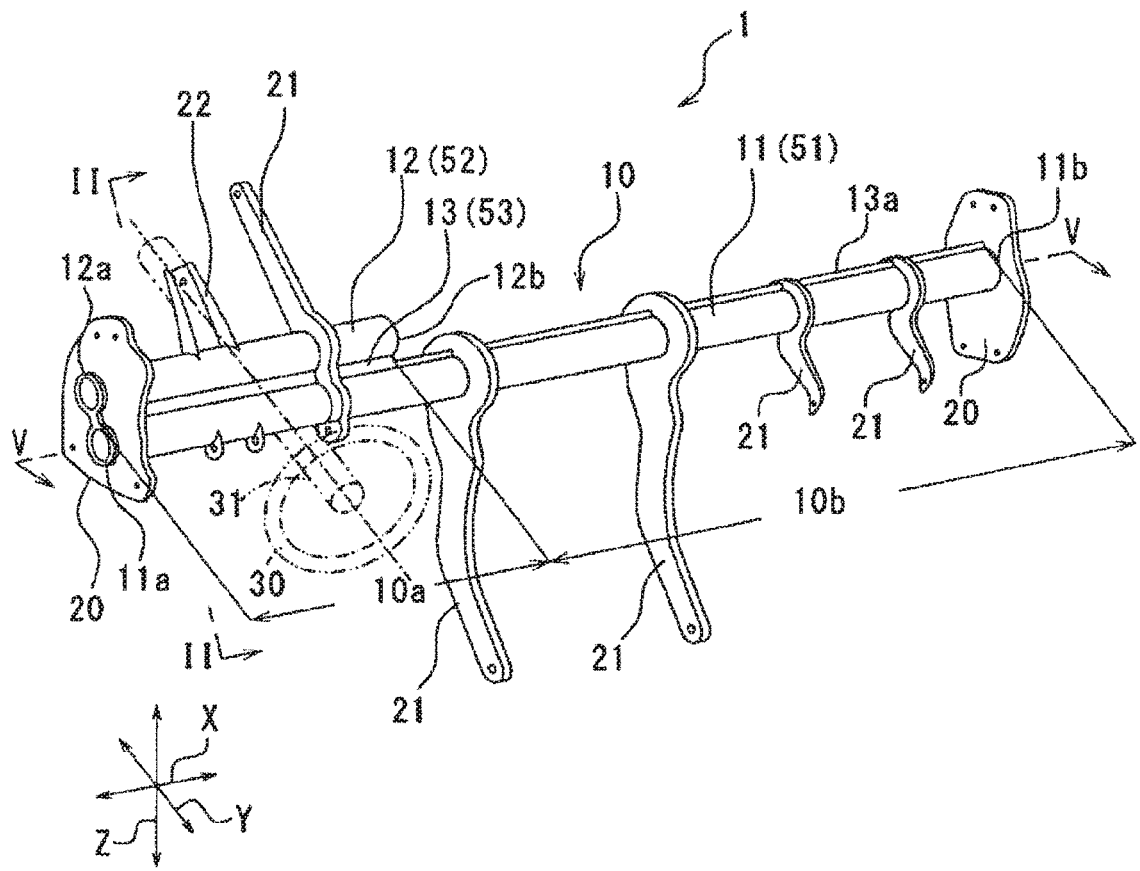
FIG. 1 is a perspective view of a vehicle structural member according to the present invention.

Referring to FIG. 1, a steering support (vehicle structural member) 1 according to the present embodiment includes an elongate hollow member 10 extending in the X direction, and various brackets (supporting members) 20, 21, and 22 joined to the elongate hollow member 10.

The elongate hollow member 10 includes a first pipe 11, and a second pipe 12 disposed outside the first pipe 11 and extending along the first pipe 11. The elongate hollow member 10 includes a connection portion 13 extending along the first pipe 11 and the second pipe 12, and formed integrally with the first pipe 11 and the second pipe 12 to connect the first pipe 11 and the second pipe 12. Respective positions of one end 11a of the first pipe 11 and one end 12a of the second pipe 12 are aligned with each other in the X direction. The elongate hollow member 10 has an integrated structure, and is constituted by an extruded member made of aluminum alloy, for example. The elongate hollow member 10 has a double pipe (first portion) 10a and a single pipe (second portion) 10b disposed in a line in a longitudinal direction. The double pipe 10a includes the first pipe 11, the second pipe 12, and the connection portion 13. The single pipe 10b includes the first pipe 11 continuing from the double pipe 10a, but does not include the second pipe 12. In other words, the double pipe 10a is a part of the elongate hollow member 10 disposed on the one end 11a side of the first pipe 11 and on the one end 12a side of the second pipe 12 with respect to an opposite end 12b of the pipe 12. The single pipe 10b is a part of the elongate hollow member 10 disposed on an opposite end 11b side of the first pipe 11 with respect to the opposite end 12b of the second pipe 12.

Figure 2:
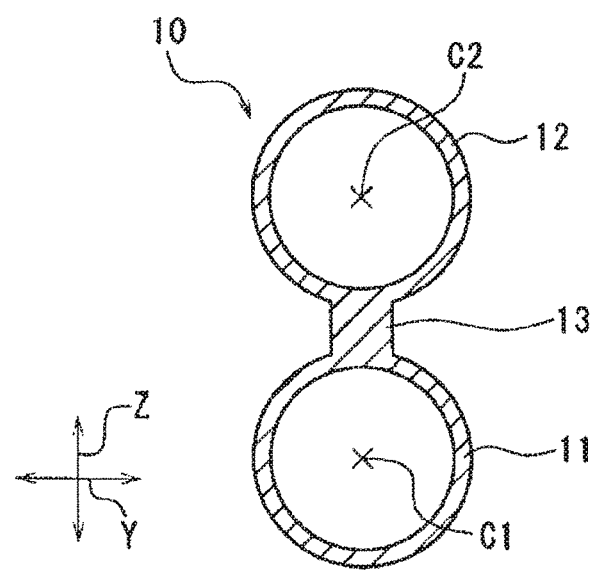

Referring to FIGS. 1 and 2, the first pipe 11 has a substantially cylindrical shape which has a longitudinal direction extending in the X direction, and has an axial center C1. A cross-sectional shape (shape of Y-Z cross section) of the first pipe 11 is substantially constant throughout the length of the first pipe 11 in the X direction.

The second pipe 12 has a substantially cylindrical shape which has a longitudinal direction extending in the X direction, and has an axial center C2. A cross-sectional shape (shape of Y-Z cross section) of the second pipe 12 is substantially constant throughout the length of the second pipe 12 in the X direction. The length of the second pipe 12 (dimension in the X direction, i.e., in the longitudinal direction) is smaller than the length of the first pipe 11. Moreover, according to the present embodiment, the cross-sectional shape of the second pipe 12 is substantially identical to the cross-sectional shape of the first pipe 11. More specifically, the outer diameter of the second pipe 12 is equal to the outer diameter of the first pipe 11, and the inner diameter of the second pipe 12 is equal to the inner diameter of the first pipe 11.

Referring to FIG. 2, the first pipe 11 and the second pipe 12 are spaced apart from each other in a radial direction of the elongate hollow member 10 (direction crossing the axial centers C1 and C2 at right angles). According to the present embodiment, a length of a distance between the axial center C1 of the first pipe 11 and the axial center C2 of the second pipe 12 is larger than a sum of the outer diameter (radius) of the first pipe 11 and the outer diameter (radius) of the second pipe 12.

The double pipe 10a including the first pipe 11 and the second pipe 12 has higher strength and rigidity than strength and rigidity of the single pipe 10b including the first pipe 11 but does not including the second pipe 12.

The connection portion 13 is a plate-shaped portion having a longitudinal direction extending in the X direction. The shape of the connection portion 13 in the double pipe 10a is different from the shape of the connection portion 13 in the single pipe 10b. Specifically, referring to FIG. 2, the cross-sectional shape (shape of Y-Z cross section) of the connection portion 13 in the double pipe 10a is substantially rectangular. In addition, the connection portion 13 is disposed between the first pipe 11 and the second pipe 12 in the double pipe 10a, and connects the first pipe 11 and the second pipe 12. The connection portion 13 constitutes a segment 13a in the single pipe 10b. The segment 13a is produced by removing a part of the connection portion 13. The segment 13a is a plate-shaped portion which protrudes in the Z direction from the first pipe 11, and extends in the X direction. The single pipe 10b includes the first pipe 11 and the segment 13a.

The brackets 20 constitute both end supporting brackets 20 for fixing the elongate hollow member 10 to not-shown vehicle side walls, and are joined to both ends of the elongate hollow member 10 in the X direction by pipe expansion. More specifically, one of the both end supporting brackets 20 is joined to the first pipe 11 and the second pipe 12 at the one end 11a of the first pipe 11 and the one end 12a of the second pipe 12 by pipe expansion, while the other of the both end supporting brackets 20 is joined to the first pipe 11 at the opposite end 11b of the first pipe 11 by pipe expansion.

The brackets 21 constitute supporting brackets 21 for supporting the elongate hollow member 10, and are joined to the elongate hollow member 10 by pipe expansion with a space left between each other in the X direction. The supporting brackets 21 mechanically connect the elongate hollow member 10 to vehicle components such as not-shown floor panel or dash panel of the vehicle.

The bracket 22 constitutes a steering bracket 22 for supporting a steering column 31 which is a rotation shaft of a steering wheel 30. The steering bracket 22 is joined to the double pipe 10a of the elongate hollow member 10 by welding.

A method for producing the steering support 1 according to the present embodiment will be next described with reference to FIGS. 3 to 5. The method for producing the steering support 1 according to the present embodiment includes a molding step, a cutting step, and a joining step.

(Molding Step)

Figure 3:
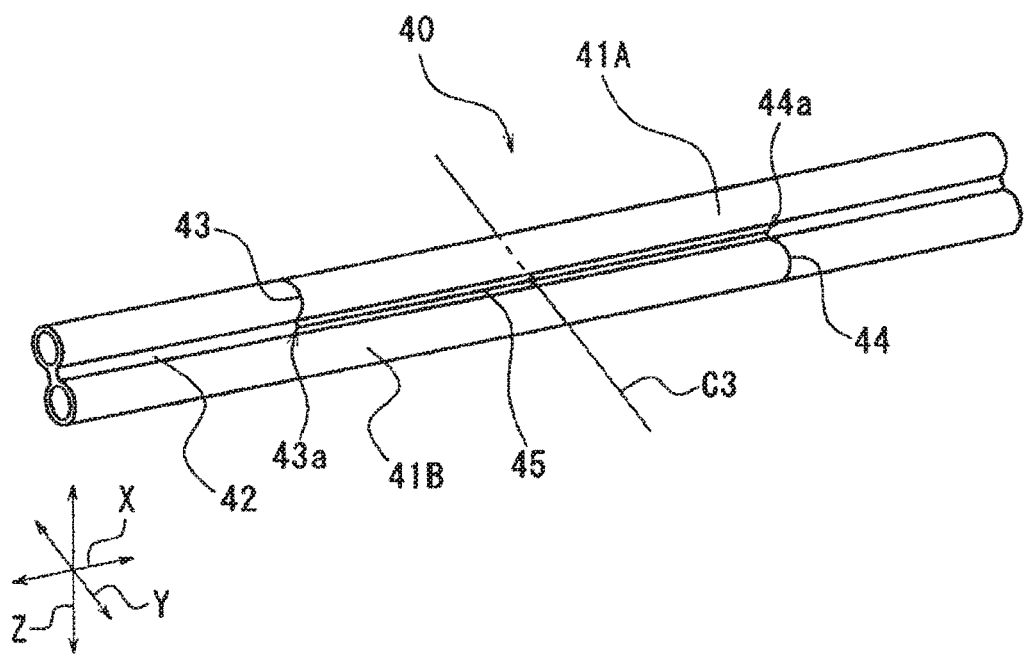
FIG. 3 is a perspective view of an element pipe used when the vehicle structural member according to the present invention is produced.

An extruded material (element pipe) 40 as shown in FIG. 3 is initially molded by extrusion molding, for example.

The extruded material 40 includes two pipes 41A and 41B disposed in parallel to each other, and a connection portion 42 for connecting the pipes 41A and 41B. The cross-sectional shape (shape of Y-Z cross section) of the extruded material 40 is substantially constant throughout the length of the extruded material 40. For example, the extruded material 40 is an extruded member made of aluminum alloy.

Each of the pipes 41A and 41B has a substantially cylindrical shape which has a longitudinal direction extending in the X direction. The pipes 41A and 41B are disposed apart from each other in radial directions (directions crossing longitudinal directions at right angles) of the pipes 41A and 41B. The connection portion 42 extends between the pipe 41A and the pipe 41B throughout the length of the extruded material 40. The cross-sectional shape (shape of Y-Z cross section) of the extruded material 40 in the connection portion 42 is substantially rectangular.

(Cutting Step)

The extruded material 40 obtained by the molding step is cut in a subsequent stage. More specifically, the pipe 41A is cut to form a first cut 43 in the pipe 41A in such a manner that the first cut 43 extends in a direction crossing the X direction and reaches the connection portion 42 as shown in FIG. 3. Similarly, the pipe 41B is cut to form a second cut 44 in the pipe 41B at a position different from the first cut 43 in the X direction such that the second cut 44 extends in a direction crossing the X direction and reaches the connection portion 42. Thereafter, the connection portion 42 is cut in the X direction to form a third cut 45 which connects an end 43a of the first cut 43 and an end 44a of the second cut 44. The first cut 43, the second cut 44, and the third cut 45 thus formed separate the extruded material 40 into the two elongate hollow III embers 50. In this case, the distance between the center of the third cut 45 in the X direction and the end 43a of the first cut 43 is equivalent to the distance between the center of the third cut 45 in the X direction and the end 44a of the second cut 44. More specifically, the extruded material 40 is cut two-fold symmetrically with respect to a center axis C3 which passes through the center of the third cut 45 in the X direction and extends in the Y direction.

Figure 4:
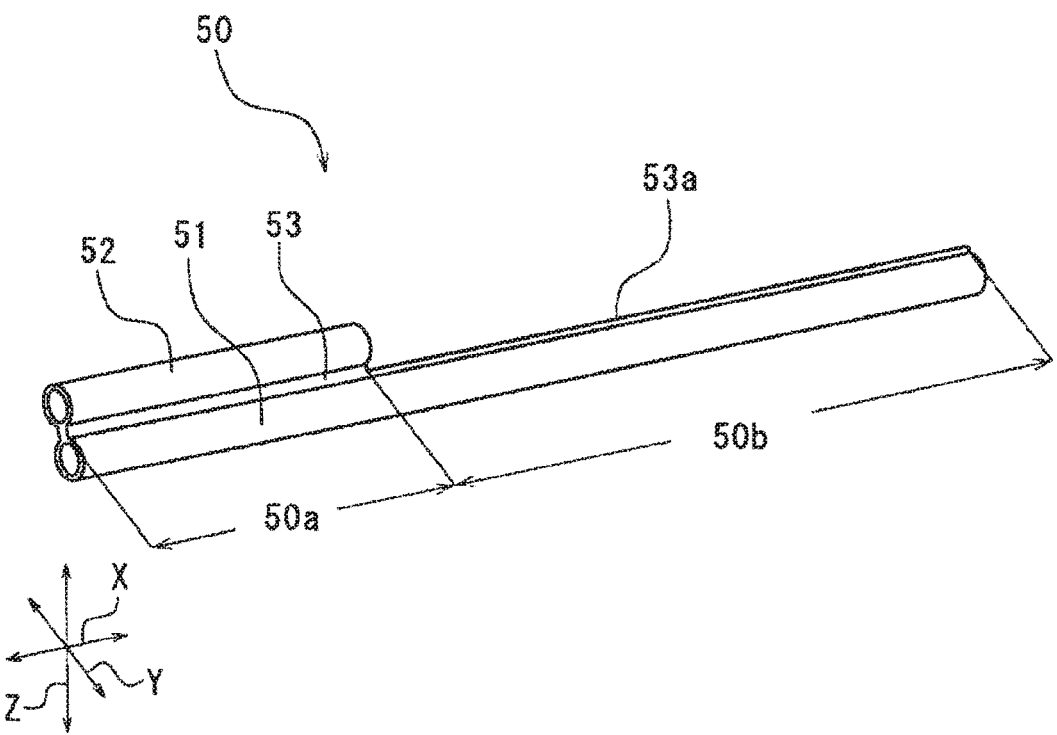
FIG. 4 is a perspective view of an elongate hollow member obtained by cutting the element pipe.

Referring to FIG. 4, the elongate hollow member 50 includes a first pipe 51, a second pipe 52 extending along the first pipe 51, and a connection portion 53 connecting the first pipe 51 and the second pipe 52. As described above, the extruded material 40 is cut two-fold symmetrically with respect to the center axis C3. Accordingly, the two elongate hollow members 50 have the same dimension.

(Joining Step)

Thereafter, the elongate hollow member 50, the both end supporting brackets 20, the supporting brackets 21 and the steering bracket 22 are joined. More specifically, the both end supporting brackets 20, the supporting brackets 21, and the steering bracket 22 are disposed in such positions as to surround the elongate hollow member 50 as shown in FIG. 1. In this condition, the elongate hollow member 50 is swaged and joined to the both end supporting brackets 20 and the supporting brackets 21 by expanding the first pipe 51 and the second pipe 52. On the other hand, the elongate hollow member 50 is welded and joined to the steering bracket 22.

Specifically described hereinafter with reference to FIGS. 5 to 7 will be swaging of the elongate hollow member 50 to the both end supporting brackets 20 and supporting brackets 21, particularly showing swaging between the first pipe 51 and one of the supporting brackets 21.

Figure 5:
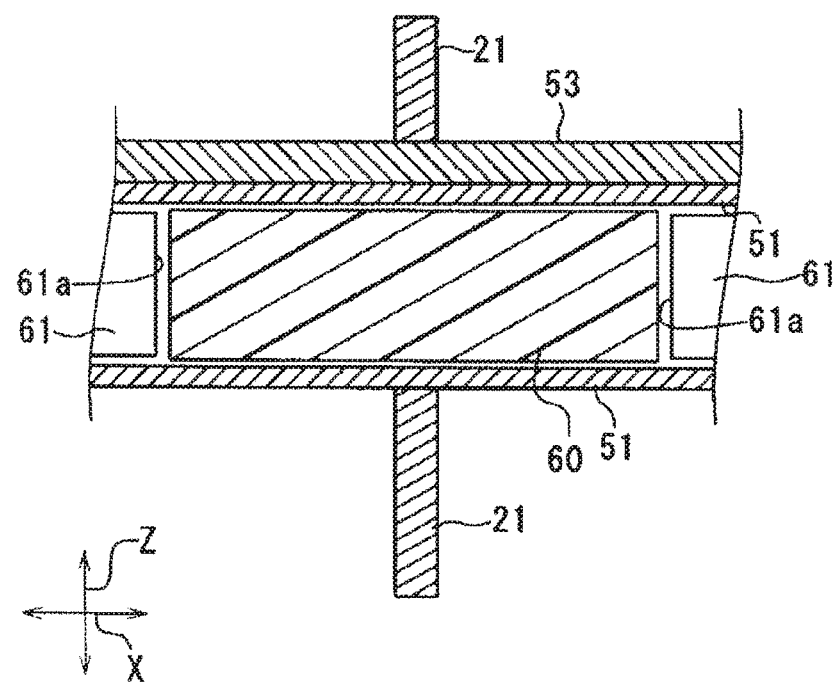
FIG. 5 is a cross-sectional view taken along a line V-V in FIG. 1 and showing a first step of a joining method.
Figure 6:
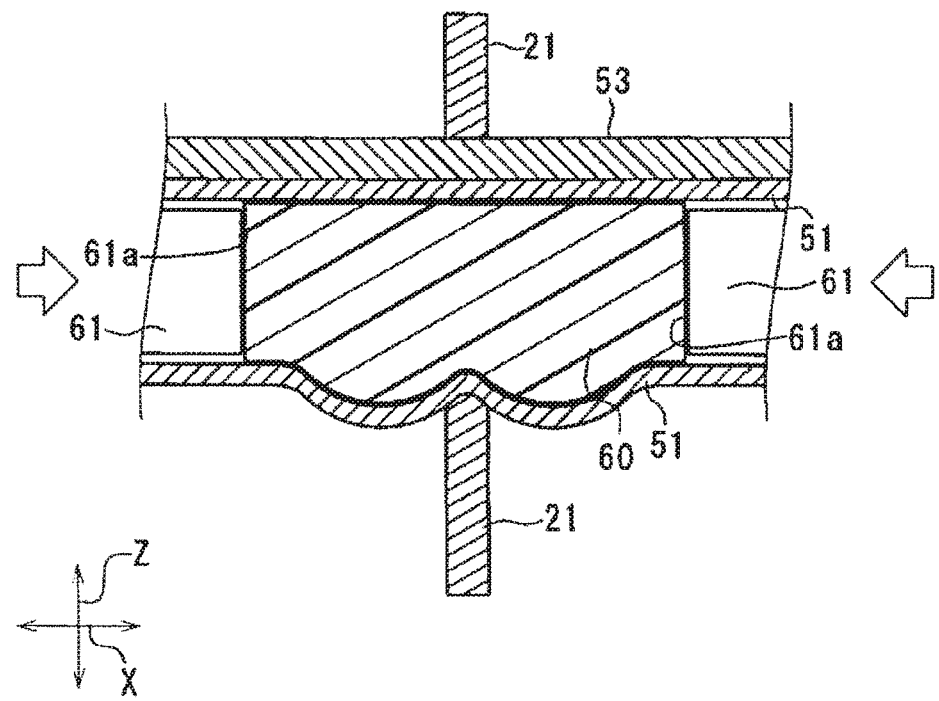
FIG. 6 is a cross-sectional view taken similarly to FIG. 5 and showing a second step of the joining method.

As shown in FIG. 5, rubber (elastic body) 60 insertable into the elongate hollow ember 50, and pressers 61 for compressing the rubber 60 are initially prepared.

The rubber 60 has a cylindrical shape extending in the longitudinal direction of the first pipe 51. The external shape of the rubber 60 is sized slightly smaller than a size of the internal shape of the first pipe 51 to a degree sufficient for insertion of the rubber 60 into the first pipe 51. The rubber 60 is preferably made of any one of urethane rubber, chloroprene rubber, CNR rubber (chloroprene rubber+nitrile rubber), and silicone rubber, for example. In addition, the rubber 60 preferably has hardness of 30 or more in Shore A.

The pressers 61 are attached to a not-shown press device or the like, and driven by the press device to compress the rubber 60 in a longitudinal direction of the rubber 60. A pressing surface 61a at an end of each of the pressers 61 is a flat surface perpendicular to a compression direction.

Subsequently, the supporting bracket 21 is disposed in such a position as to surround the first pipe 51. In addition, the rubber 60 is inserted into the first pipe 51, and the pressers 61 are inserted into the first pipe 51 from both ends of the first pipe 51.

Thereafter, the rubber 60 is compressed in the longitudinal direction of the rubber 60 and expanded in the direction crossing the compression direction at right angles by pressing the pressers 61 from both ends of the first pipe 51. In this manner, expansion of the first pipe 51 is achieved as shown in FIG. 6. This expansion swages the first pipe 51 to the supporting bracket 21.

Figure 7:
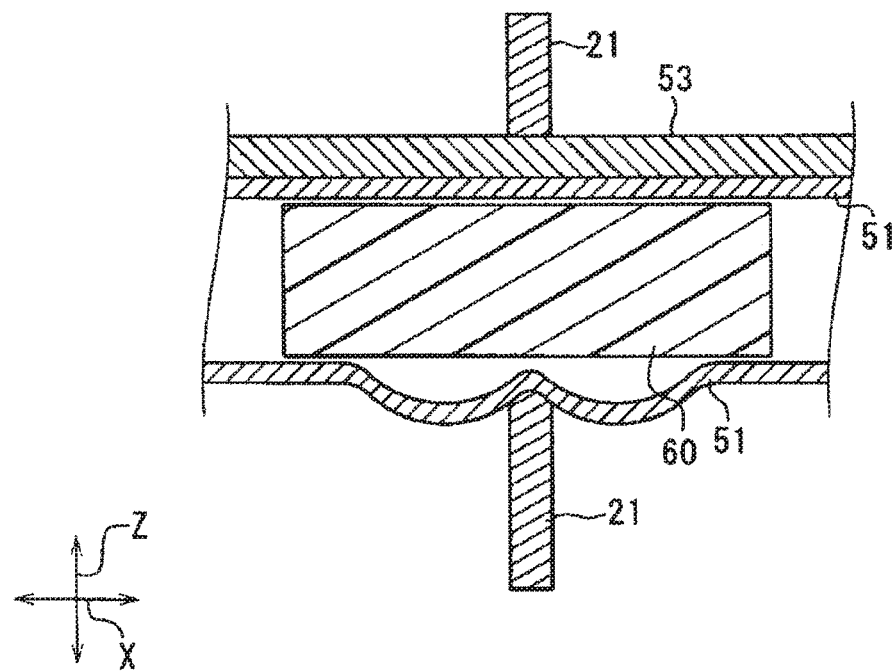
FIG. 7 is a cross-sectional view taken similarly to FIG. 5 and showing a third step of the joining method.

After swaging, the pressers 61 are decompressed as shown in FIG. 7. The decompressed rubber 60 returns to an original shape of the rubber 60 by own elastic force of the rubber 60. Accordingly, the rubber 60 can be easily removed from the first pipe 51.

The first cut 43, the second cut 44, and the third cut 45 may be formed in any order in the cutting step.

For joining between the elongate hollow member 50 and the plurality of brackets 20 and 21 by pipe expansion, the elongate hollow member 50 may be joined to each of the plurality of brackets 20 and 21 individually by pipe expansion, or may be joined simultaneously to the plurality of brackets 20 and 21 by pipe expansion.

The elongate hollow member 50 may be joined to the both end supporting brackets 20 and the supporting brackets 21 by other joining methods such as welding, and pipe expansion using electromagnetic molding.

The elongate hollow member 50 may be joined to the steering bracket 22 by other joining methods such as pipe expansion.

The steering support 1 and the method for producing the steering support 1 according to the present embodiment have following features.

As described above, the double pipe 10a has higher strength and rigidity than strength and rigidity of the single pipe 10b. In addition, the double pipe 10a and the single pipe 10b of the elongate hollow member 10 produced by cutting the extruded material 40 are formed integrally with each other. In this case, additional processing such as welding or diameter reduction is unnecessary. Accordingly, reduction of processing cost is achievable while partially improving the strength and rigidity of the steering support 1.

Moreover, the elongate hollow member 10 has an integrated structure without any joint parts, and therefore has higher strength and rigidity in comparison with strength and rigidity of a similar member produced by joining a plurality of members. Furthermore, the elongate hollow member 10 not diameter-reduced can be easily joined to a supporting member such as a bracket by pipe expansion.

In the cutting step for cutting the extruded material 40, the connection portion 42 constituted by a plate-shaped portion and formed between the two pipes 41 is cut. Accordingly, an open cross-section is not produced between the first pipe 51 and the second pipe 52 of the elongate hollow member 50.

The two elongate hollow members 50 having the same shape and size can be simultaneously produced by cutting the extruded material 40 two-fold symmetrically with respect to the center axis C3. Accordingly, yield improves while reducing processing cost.

The brackets 20 and 21 are joined to the elongate hollow member 10 by pipe expansion using the rubber 60. Isotropic deformability of the rubber 60 achieves uniform expansion of the first pipe 51 and the second pipe 52 of the elongate hollow member 50. In this case, a local load imposed on the elongate hollow member 50 decreases, wherefore local deformation of the elongate hollow member 50 is avoidable. Accordingly, the elongate hollow member 50 can be joined to the various brackets 20 and 21 with higher accuracy in comparison with other joining methods. Moreover, the pipe expansion method adopted herein can simultaneously join a plurality of brackets to the elongate hollow member 50. Accordingly, the number of processing steps decreases, wherefore more reduction of processing cost can be achieved in comparison with other joining methods.

Modifications of the elongate hollow member 10 of the present embodiment will be hereinafter described with reference to FIGS. 8 to 10.

Figure 8:
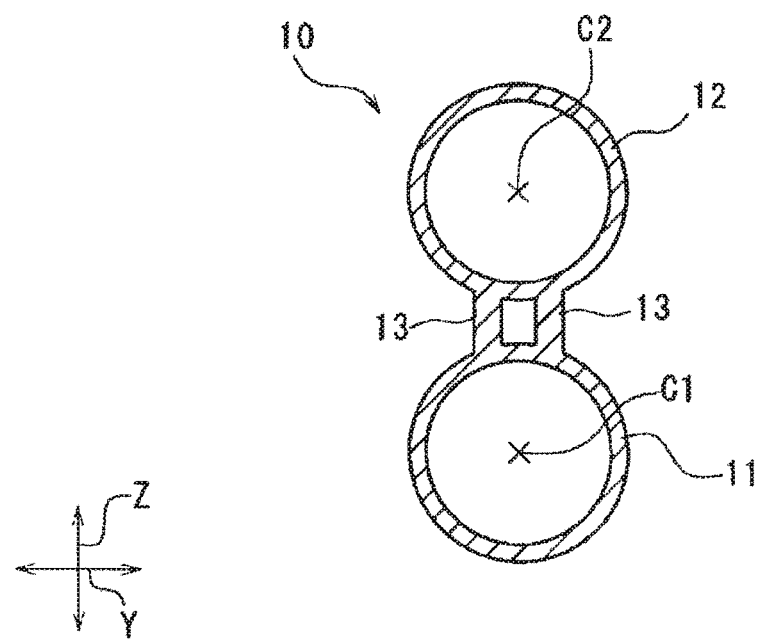
FIG. 8 is a view taken similarly to FIG. 2 and showing a vehicle structural member according to a first modification of the present invention.

In a first modification shown in FIG. 8, the elongate hollow member 10 includes the first pipe 11, the second pipe 12, and a pair of the connection portions 13.

Figure 9:
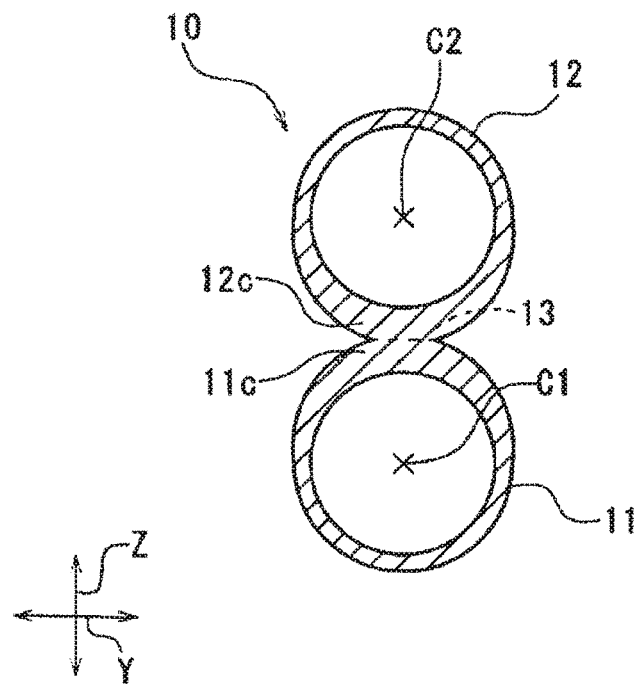
FIG. 9 is a view taken similarly to FIG. 2 and showing a vehicle structural member according to a second modification of the present invention.

In a second modification shown in FIG. 9, the first pipe 11 and the second pipe 12 have thick portions 11c and 12c, respectively. The connection portion 13 is an interface between the thick portion 11c and the thick portion 12c.

Figure 10:
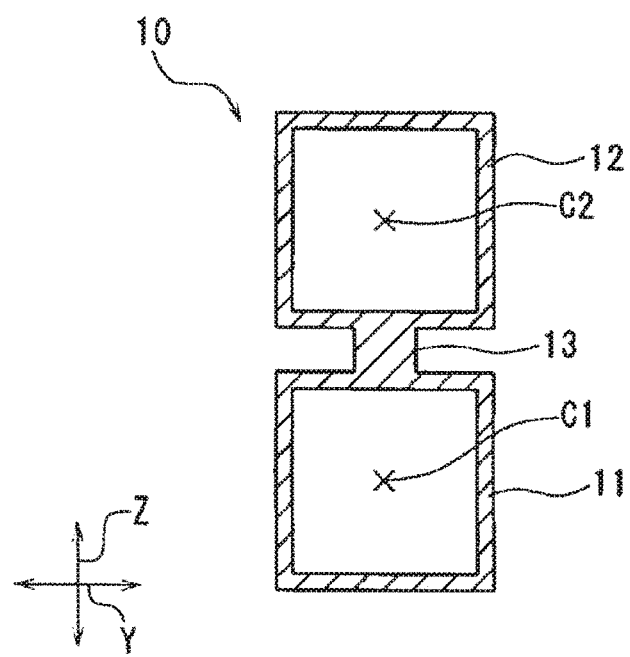
FIG. 10 is a view taken similarly to FIG. 2 and showing a vehicle structural member according to a third modification of the present invention.

In a third modification shown in FIG. 10, the first pipe 11 has a rectangular cross-sectional shape (shape of Y-Z cross section). Similarly, the second pipe 12 has a rectangular cross-sectional shape.

The present invention is not limited to specific embodiments including the preferred embodiment of the present invention described herein, but may be modified in various manners within the scope of the subject matter of the present invention as claimed in the appended claims.

The vehicle structural member 1 according to the present invention is not limited to the steering support 1, but is applicable to other vehicle structural members.

Each of the first pipe 11 and the second pipe 12 may have a polygonal cross-sectional shape (shape of Y-Z cross section).

The elongate hollow member 10 may be made of aluminum material such as pure aluminum or aluminum alloy, or may be iron material such as iron or high tensile strength steel.

Moreover, each of the various brackets 20, 21 and 22 may be made of either aluminum material or iron material.

Accordingly, the entire vehicle structural member 1 may be made of either aluminum material or iron material.

The pipe expansion performed in the joining step is not limited to pipe expansion using rubber, but may be pipe expansion using electromagnetic molding or pipe expansion using hydraulic pressure.

The invention claimed is:

1. A vehicle structural member comprising:
an elongate hollow member having an integrated structure; and
a supporting member joined to the elongate hollow member,
wherein the elongate hollow member includes:
a first portion that includes a first pipe, a second pipe disposed outside the first pipe and extending along the first pipe, and a connection portion extending along the first pipe and extending along an entirety of a length of the second pipe, formed integrally with the first pipe and the second pipe, and connecting the first pipe and the second pipe; and
a second portion that includes the first pipe continuing from the first portion, and does not include the second pipe.

2. The vehicle structural member according to claim 1, wherein
the first pipe and the second pipe are spaced apart from each other in a direction crossing longitudinal directions of the first pipe and the second pipe, and
the connection portion is a plate-shaped portion.

3. The vehicle structural member according to claim 2, wherein positions of one end of the first pipe and one end of the second pipe are aligned with each other in the longitudinal directions of the first pipe and the second pipe.

4. The vehicle structural member according to claim 2, wherein each of the first pipe and the second pipe has a substantially constant cross-sectional shape in the corresponding longitudinal direction.

5. The vehicle structural member according to claim 1, wherein the vehicle structural member is a steering support.

6. The vehicle structural member according to claim 3, wherein each of the first pipe and the second pipe has a substantially constant cross-sectional shape in the corresponding longitudinal direction.

7. The vehicle structural member according to claim 2, wherein the vehicle structural member is a steering support.

8. The vehicle structural member according to claim 3, wherein the vehicle structural member is a steering support.

9. The vehicle structural member according to claim 1, wherein the connection portion extends along an entirety of a length of the first pipe.

10. The vehicle structural member according to claim 1, further comprising a bracket joined to the first pipe and the second pipe.

* * * * *